(12) United States Patent
Ranade et al.

(10) Patent No.: US 8,881,766 B2
(45) Date of Patent: Nov. 11, 2014

(54) DAMPER ASSEMBLY

(75) Inventors: Bhushan Ranade, Hillsborough, NJ (US); H. James Peters, Doylestown, PA (US); Jason Fabisch, Burlington, NJ (US)

(73) Assignee: Hamon Research-Cottrell, Inc., Somerville, NJ (US)

( * ) Notice: Subject to any disclaimer, the term of this patent is extended or adjusted under 35 U.S.C. 154(b) by 123 days.

(21) Appl. No.: 13/357,286

(22) Filed: Jan. 24, 2012

(65) Prior Publication Data

US 2013/0081729 A1    Apr. 4, 2013

Related U.S. Application Data

(60) Provisional application No. 61/626,772, filed on Oct. 3, 2011.

(51) Int. Cl.
| | |
|---|---|
| F16K 1/16 | (2006.01) |
| F24F 13/08 | (2006.01) |
| F24F 13/15 | (2006.01) |
| F16L 45/00 | (2006.01) |
| F16K 1/22 | (2006.01) |

(52) U.S. Cl.
CPC *F16L 45/00* (2013.01); *F16K 1/223* (2013.01)
USPC ................... 137/601.11; 137/601.15

(58) Field of Classification Search
CPC ...... F24F 13/15; F24F 13/1426; F16K 1/223; F16K 1/165; F16K 1/221
USPC ...................... 137/601.11, 601.15
See application file for complete search history.

(56) References Cited

U.S. PATENT DOCUMENTS

| | | | |
|---|---|---|---|
| 3,631,790 A | | 1/1972 | Olsen et al. |
| 3,843,090 A | * | 10/1974 | Schneider et al. ............ 251/215 |
| 3,941,310 A | | 3/1976 | Travaglio et al. |
| 4,014,253 A | | 3/1977 | Dry |
| 4,018,159 A | | 4/1977 | Bennett |
| 4,354,528 A | * | 10/1982 | McAndrew ................... 137/875 |
| 4,487,214 A | | 12/1984 | Tatum |
| 4,581,987 A | | 4/1986 | Ulicny |
| 4,840,113 A | | 6/1989 | Freitag et al. |
| 5,186,387 A | | 2/1993 | Doi et al. |
| 5,276,433 A | | 1/1994 | Booker et al. |
| 5,388,426 A | | 2/1995 | Wada et al. |
| 5,533,929 A | * | 7/1996 | Attridge, Jr. .................. 454/369 |
| 5,591,079 A | | 1/1997 | Saida |
| 5,704,545 A | | 1/1998 | Sweitzer, Jr. |
| 5,907,926 A | | 6/1999 | Sosa |

(Continued)

*Primary Examiner* — John Rivell
*Assistant Examiner* — Michael R Reid
(74) *Attorney, Agent, or Firm* — Warner Norcross & Judd LLP

(57) ABSTRACT

A damper assembly for use in an industrial duct used for venting contaminated gasses having particulate matter suspended therein. The damper assembly removes precipitate from the duct that was deposited by the contaminated gas and particulate matter. The damper assembly includes an articulating member which is movable between an open position and a closed position along a first axial direction. Opposing blades are disposed on opposite sides of the articulating member. Each of the opposing blades define a distal edge and are pivotable about axes that are substantially parallel to one another. A link couples each blade to the articulating member such that the motion from the articulating member is transfer to the blades. Each link is coupled to the blade between the distal edge and the respective parallel axis.

6 Claims, 6 Drawing Sheets

(56) References Cited

U.S. PATENT DOCUMENTS

| | | |
|---|---|---|
| 5,944,445 A | 8/1999 | Montgomery |
| 5,987,836 A | 11/1999 | Sullivan |
| 6,015,342 A | 1/2000 | Dennis |
| 6,219,970 B1 | 4/2001 | Liu |
| 6,270,401 B1 | 8/2001 | Wormmeester |
| 6,447,393 B1 * | 9/2002 | McCabe ............ 454/369 |
| 6,471,580 B2 | 10/2002 | Ro |
| 6,564,819 B2 | 5/2003 | Zelczer |
| 6,698,445 B2 | 3/2004 | Zelczer |
| 6,817,378 B2 | 11/2004 | Zelczer |
| 6,845,964 B2 | 1/2005 | Ro |
| 2006/0286918 A1 | 12/2006 | Vargas |
| 2007/0123158 A1 | 5/2007 | Shibata et al. |
| 2008/0153409 A1 | 6/2008 | Koop |

* cited by examiner

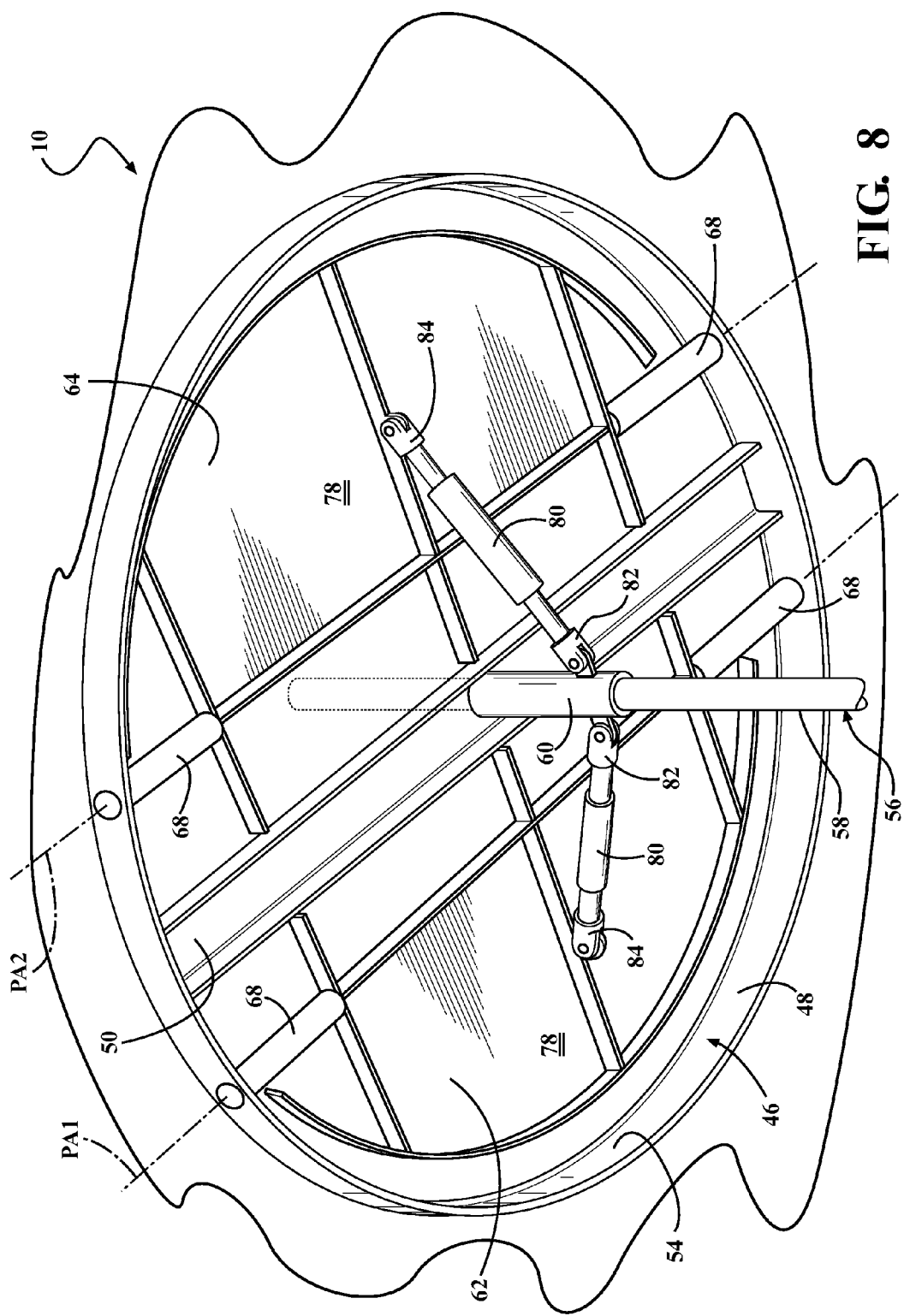

DAMPER ASSEMBLY

CROSS-REFERENCE TO RELATED APPLICATIONS

The subject patent application claims priority to and all the benefits of U.S. Provisional Patent Application Ser. No. 61/626,772 which was filed on Oct. 3, 2011, the entire specification of which is expressly incorporated herein by reference.

BACKGROUND

1. Field of the Disclosure

The present disclosure relates to a damper assembly. More particularly, the present disclosure relates to a folding damper assembly for use in an industrial duct.

2. Description of the Related Art

Many industrial applications make use of large ducts where gaseous fluid, such as air, is transferred between stages of an industrial process. Often, these applications cause particulate matter to become suspended in the gaseous fluid which is also transferred through the ducts. As the gaseous fluid passes through the ducts, precipitate is known to fall from the gaseous fluid and accumulate on the bottom walls of the duct. The art typically utilizes louver dampers to enable communication between ducts and allow the precipitate to fall out of the ducts. However, if the accumulated precipitate becomes too heavy, the louver dampers are not able to overcome loading due to the accumulated precipitate. Therefore, there remains a need in the art for an improved damper system to allow the accumulation of precipitate to be removed from the industrial ducts without the need to lift the heavy accumulation of precipitate on the bottom wall of the ducts.

SUMMARY

A damper assembly is used in an industrial duct for venting contaminated gasses having suspended particulate matter. The damper includes an articulating member that is moveable in a first axial direction. Opposing blades are disposed on opposite sides of the articulating member. The opposing blades are pivotable around substantially parallel axes oriented in a second axial direction. The opposing blades each define a distal edge and a proximal end. A ling is connected to each of the opposing blades between the parallel axes and the distal edge of the blades and the link transfers motion to the opposing blades from the articulating member.

The inventive position of the links and the pivot axes on the blades of the present damper eliminates the need to counteract the force associated with opening the damper when significant amounts of particulate matter or precipitate collects on top of the damper. Where prior art louver dampers and the like have been unable to overcome the weight of the precipitate, the present damper makes use of the weight to assist opening the damper to vent the precipitate to the remediation apparatus. Additionally, the location of the link on the blade also provides for enough force on the distal edge and proximal end of the blade to substantially seal the opening in the duct when desired.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 8 is a perspective view of a damper assembly in a closed position.

DETAILED DESCRIPTION

With reference to the Figures, wherein like numerals indicate like parts throughout the several views, an inventive damper assembly is generally shown at 10. The damper assembly 10 is may be installed in a remediation system 12. The remediation system 12 typically comprises at least one industrial duct 14 for carrying gaseous fluid from an industrial process to a treatment process requiring filtration, remediation, chemical neutralization, or equivalent treatment to meet environmental regulations. However, it should be appreciated by those of ordinary skill in the art that any gasses may be treated by the remediation system 12 without deviating from the scope of the present disclosure.

A neutralizing agent is introduced to the industrial process prior to the industrial duct shown in the Figures to neutralize the objectionable gasses. Neutralizing the objectionable gasses may include, but is not limited to, removing an odor from the gasses, counteracting a toxin within the gasses, elimination of acidic particulate matter such that the objectionable gasses are less harmful. The neutralizing agent may chemically react with the objectionable gasses and/or the neutralizing agent may mechanically bond with predetermined elements within the objectionable gasses. The neutralizing agent may include calcium based products such as calcium oxide or calcium hydroxide or other equivalent agents used to remediate industrial waste gasses. These calcium based products are commonly referred to in the industry as lime. However, it is to be appreciated that other neutralizing agents may also be utilized with the lime or in place of the lime without deviating from the scope of the present disclosure.

Figure 1:
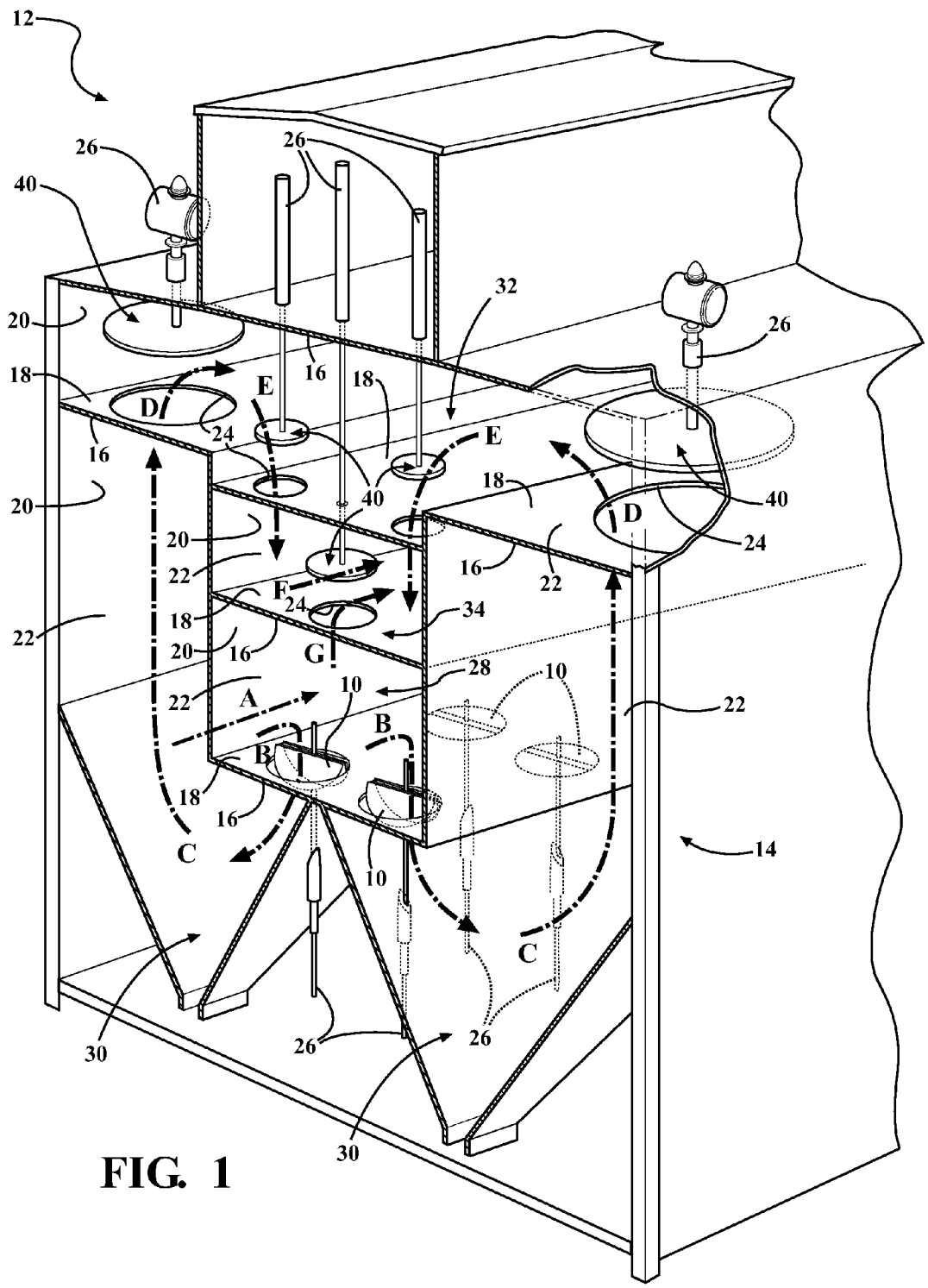
FIG. 1 is a perspective view of a portion of a filtration system utilizing a damper assembly of the present invention.
Figure 2:
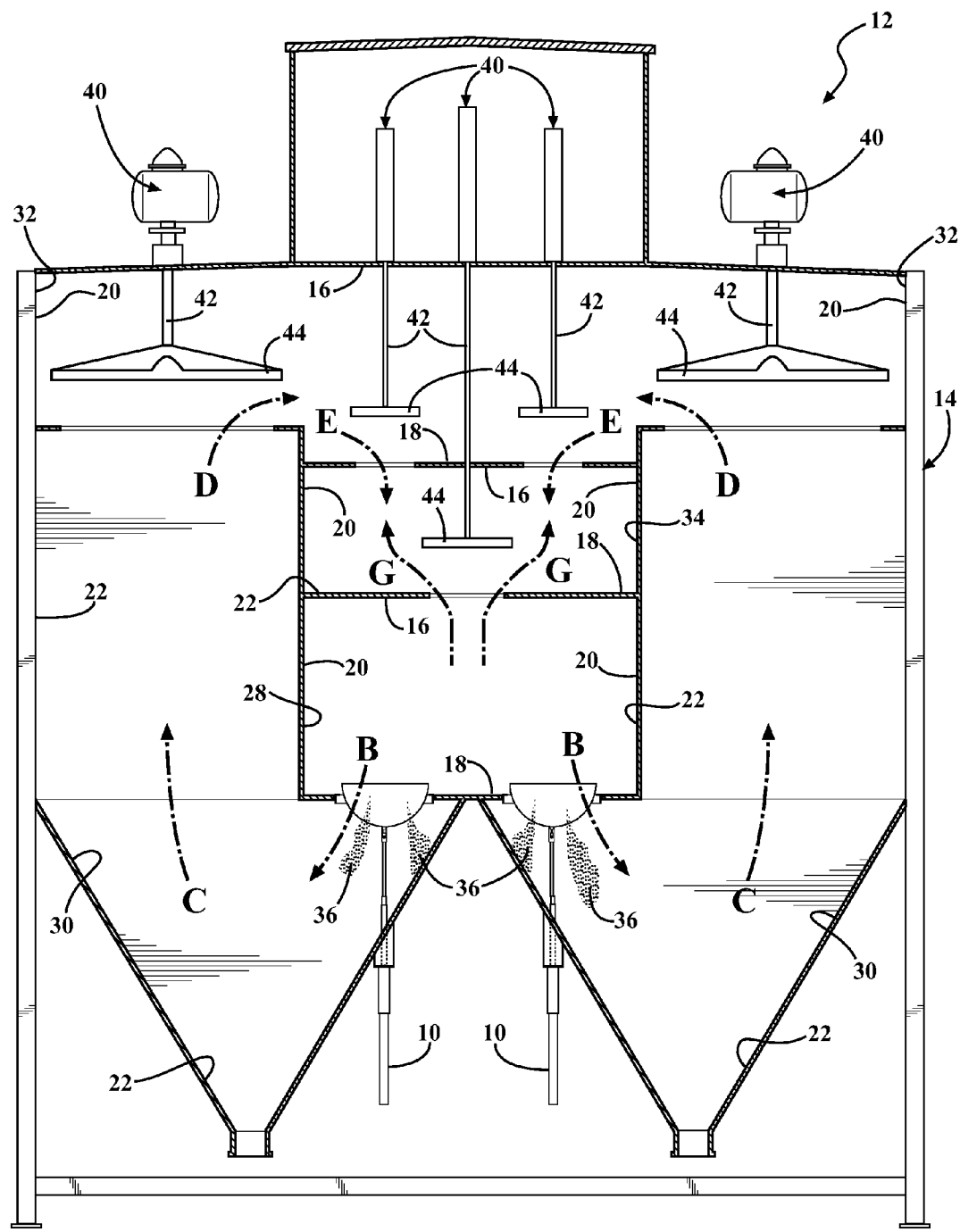
FIG. 2 is a cross-sectional end view of the filtration system taken along 2-2 of FIG. 1.
Figure 3:
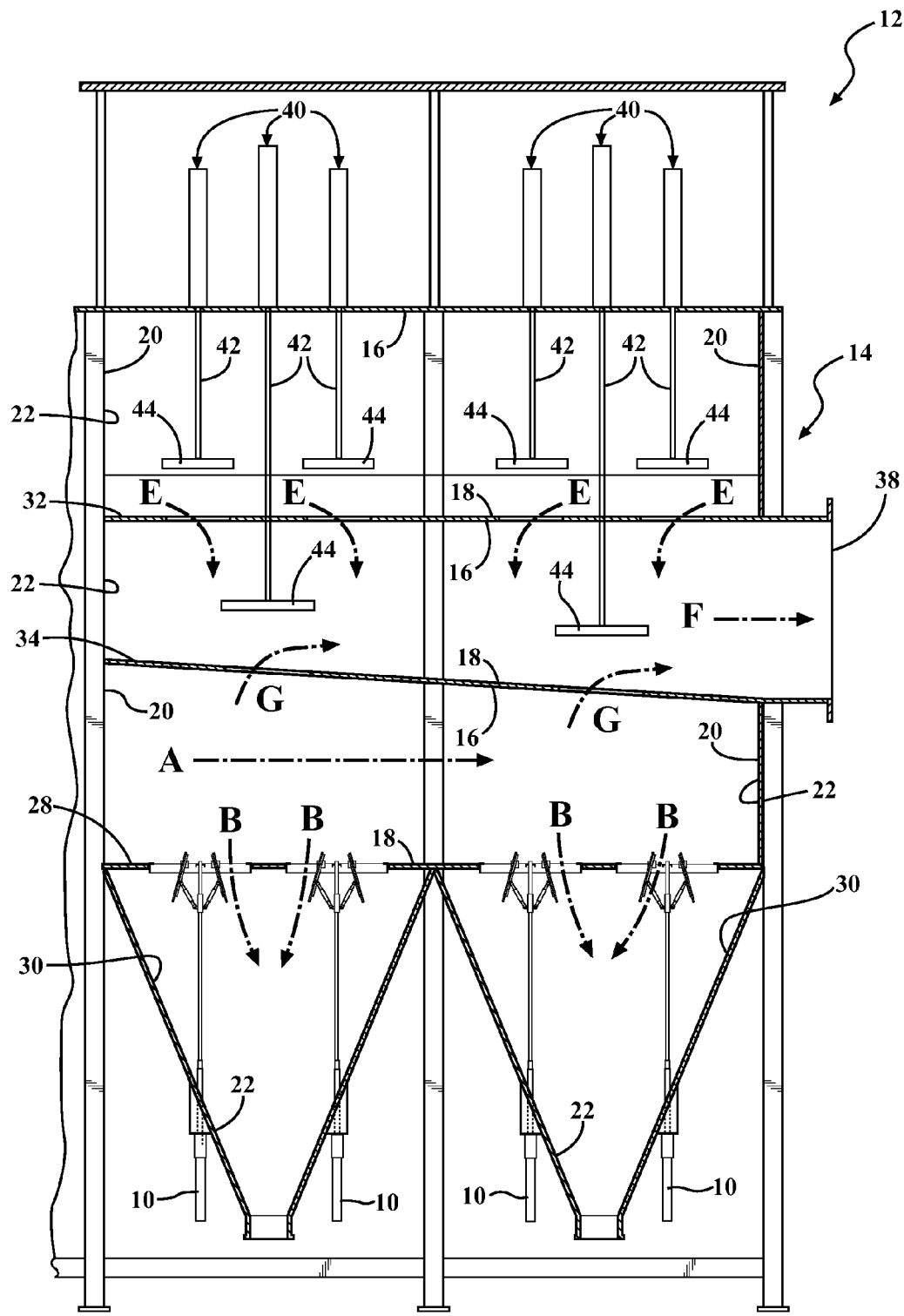
FIG. 3 is a is a cross-sectional side view of the filtration system taken along 3-3 of FIG. 1.
Figure 4:
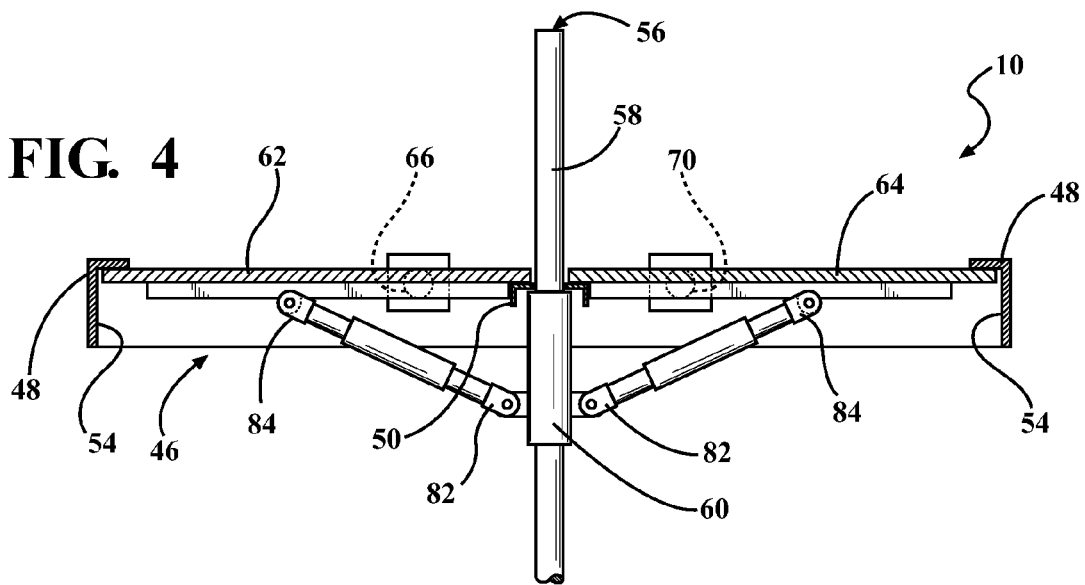
FIG. 4 is a partially cross-sectioned side view illustrating a damper assembly in a closed position.
Figure 5:
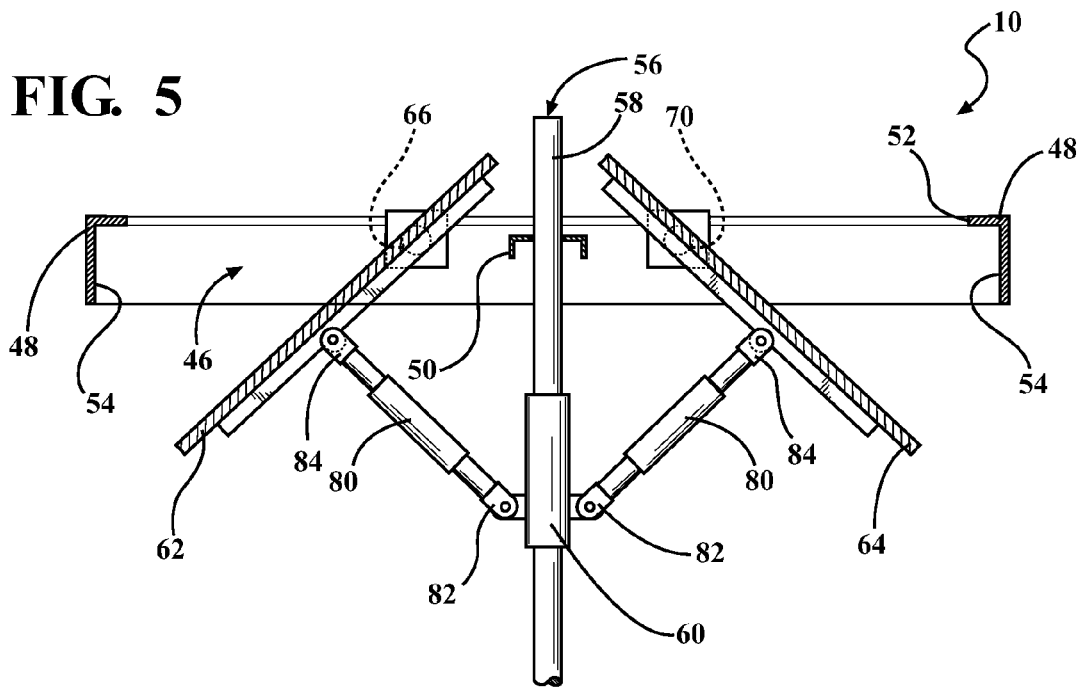
FIG. 5 is a partially cross-sectioned side view illustrating a damper assembly between an open position and a closed position.
Figure 6:
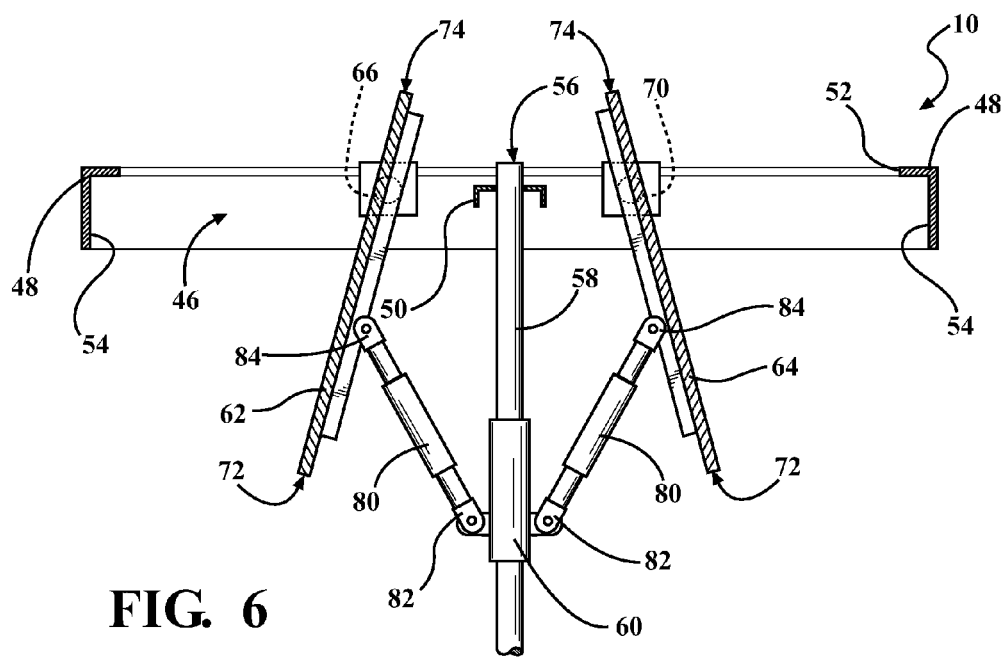
FIG. 6 is a partially cross-sectioned side view illustrating a damper assembly in an open position.
Figure 7:
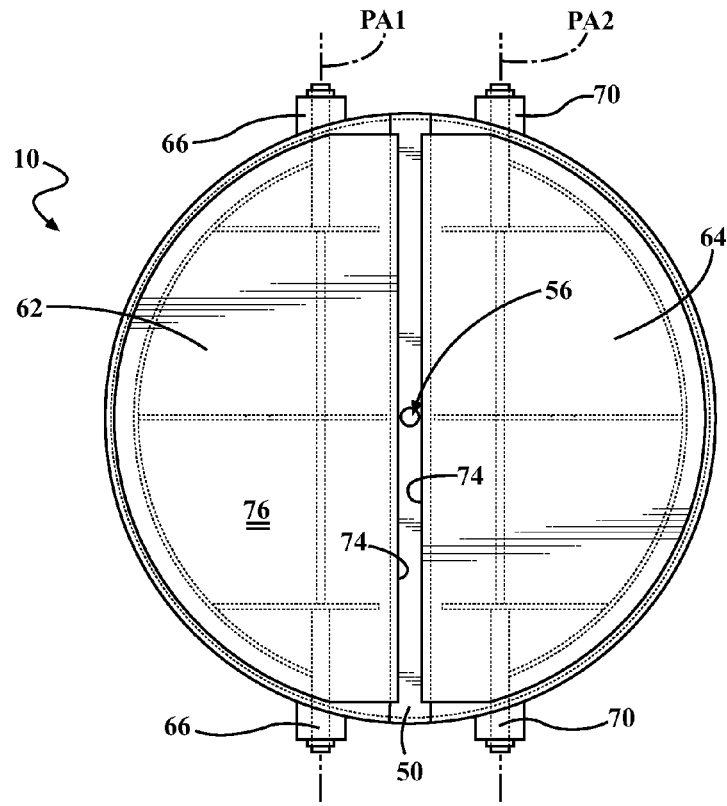
FIG. 7 is a top plan view of a damper assembly in a closed position.

Referring to FIGS. 1-3, an exemplary arrangement of industrial ducts 14 is shown. Each of the ducts 14 comprise a top wall 16 and a bottom wall 18 spaced from the top wall 16. The ducts 14 further include side walls 20 spaced from one another and with the side walls 20 bounding the top and bottom walls 14, 16 for defining a cavity 22 within each of the ducts 14. It should be appreciated that the ducts 14 may share walls with one another. In other words, the bottom wall 18 of one of the ducts 14 may also be the top wall 16 of an adjacent one of the ducts 14 or adjacent ducts 14 may be separated by common side walls 20. The walls of the ducts 14 define apertures 24 for allowing adjacent ducts 14 to selectively communicate with one another. Typically, the top wall 14 and/or bottom wall 16 define the apertures 24, as shown in the figures. However, the side walls 20 may also define apertures 24 without deviating from the scope of the present disclosure.

A plurality of gates 26 is typically utilized to cover each of the apertures 24 defined by the walls. The gates 26 are movable between a sealed position and an unsealed position for selectively allowing communication between the industrial ducts 14. When the gates 26 are in the sealed position, each of the apertures 24 are covered by the gates 26. When the gates 26 are in the unsealed position, the gates 26 expose at least a portion of each of the apertures 24 and allows fluid communication between adjacent ducts 14. It is to be appreciated that the gates 26 may be individually controlled such that each of the gates 26 may be moved between the sealed and unsealed positions independently of the other gates 26. Alternatively, the gates 26 may be configured to synchronously move between the sealed and unsealed positions such that each of the gates 26 move between the sealed and unsealed positions at the same time as the other gates 26. It is to be appreciated that any number of gates 26 may be configured to synchronously move together. The operation of the gates 26 will be discussed in greater detail below.

For illustrative purposes only, the movement of the gaseous fluid through the ducts 14 will now be discussed in greater detail with reference to the exemplary arrangement of industrial ducts 14. The term gaseous fluid may include the objectionable gasses produced by the industrial process, the neutralizing agent dispersed within the objectionable gasses, other particulate matter disposed within the objectionable gasses, by-product produced by exposing the objectionable gasses to the neutralizing agent, and any combination thereof. The exemplary arrangement includes a primary duct 28, a remediation apparatus 30, a secondary duct 32 and an exhaust duct 34. The remediation apparatus 30 can take the form of a plurality of hoppers, filters, or combination of hoppers and filters. Each of the ducts 14 and the remediation apparatus 30 are selectively in communication with one another, either directly or indirectly. The gaseous fluid enters and flows into the primary duct 28 as illustrated by arrow A. A precipitate 36 falls from the gaseous fluid as the gaseous fluid flows through the primary duct 28 and collects on the bottom wall 18 of the primary duct 28. The gates 26 disposed between the primary duct 28 and the remediation apparatus 30 move to the unsealed position, thereby causing the precipitate 36 to fall and the gaseous fluid to flow from the primary duct 28 into the remediation apparatus 30 as illustrated by arrow B. The remediation apparatus 30 is shown as a hopper for collecting the precipitate 36; however the remediation apparatus 30 is not so limited and may include filtration, or any other remediation function. The gaseous fluid moves through the remediation apparatus 30 and toward the top wall 16, as illustrated by arrow C. The gates 26 disposed between the remediation apparatus 30 and the secondary duct 32 may open and allow the gaseous fluid to pass into the secondary duct 32, as illustrated by arrow D. The gates 26 disposed between the secondary duct 32 and the exhaust duct 34 open and allow the gaseous fluid to pass into the exhaust duct 34, as illustrated by arrow E. The gaseous fluid flows through the exhaust duct 34, illustrated by arrow F, and toward an outlet manifold 38, best shown in FIG. 3. The outlet manifold 38 enables the industrial ducts 14 to be coupled to additional operations to further process the gaseous fluid as needed. Additionally, the gaseous fluid flow directly between the primary duct 28 and the exhaust duct 34. The gates 26 disposed between the primary duct 28 and the exhaust duct 34 move to the unsealed position and the gaseous fluid flow from the primary duct 28 to the exhaust duct 34 and toward the outlet manifold 38, as illustrated by arrow G.

The gates 26 disposed between the remediation apparatus 30 and the secondary duct 32, between the secondary duct 32 and the exhaust duct 34, and between the primary duct 28 and the exhaust duct 34 are further defined as poppets 40. Each of the poppets 40 includes a rod 42 and a plate 44 coupled to the rod 42. Each plate 44 is configured to cover each of the apertures 24 defined by the walls 16, 18, 20 of the ducts 14. In other words, the plate 44 defines a shape complementary to that of each of the apertures 24. Typically, the apertures 24 are circular and the plate 44 therefore define a complementary circular shape. However, it is to be appreciated that the apertures 24 and each plate 44 may define any other shape without deviating from the scope of the present disclosure. Each of the poppets 40 typically move between the sealed and unsealed positions in a linear motion. Poppets 40 of this style are well known in the art, therefore it is believed that additional description is unnecessary.

As discussed above, the precipitate 36 accumulates on the bottom wall 18 as the gaseous fluid flows through the primary duct 28 at locations where the poppets 40 are closed. The weight of the precipitate 36 increases rapidly as the precipitate 36 accumulates on the bottom wall 18, particularly where large volumes of precipitate or particulate matter are suspended in the industrial waste gasses. The damper assembly 10 of the present invention allows the majority of the precipitate 36 to be dumped and only lifts a small percentage of the precipitate 36 when opening, which differs from known dampers that lift at least half the precipitate. The damper assembly 10 is coupled to the bottom wall 18 of the primary duct 28.

With reference to FIGS. 4-8, the damper assembly 10 of the present disclosure includes a frame 46. The frame 46 comprises a peripheral member 48 and a bifurcating member 50 coupled to and extending within the peripheral member 48. The peripheral member 48 is coupled to duct within the aperture 24 defined therein. The peripheral member 48 defines an opening 52 with the opening 52 having a periphery 54. The opening 52 may define any shape, such as, but not limited to, a circle, square, rectangular, diamond, or any other appropriate shape.

An articulating member 56 is slidably disposed through the bifurcating member 50 and is movable in a first axial direction between an open position and a closed position. The articulating member 56 typically comprises a shaft 58 and a collar 60 disposed over the shaft 58. The collar 60 may be fixedly attached to the shaft 58 such that the shaft 58 and the collar 60 move together between the open and closed positions. Alternatively, the collar 60 may be slidably disposed over the shaft 58 such that the collar 60 moves along the shaft 58 between the open and closed positions while the shaft 58 remains stationary.

A first blade 62 and a second blade 64 spaced from the first blade 62 are configured to cooperatively cover the opening 52 defined by the frame 46. The first blade 62 is pivotably coupled to the peripheral member 48 of the frame 46 at a first pivot 66. An axle is coupled to the first blade 62 and defines a first pivot axis PA1 along the first pivot 66. Similarly, the second blade 64 is pivotably coupled to the peripheral member 48 of the frame 46 at a second pivot 70 with another axle coupled to the second blade 64 and defining a second pivot axis PA2 along the second pivot 70. The second pivot axis PA2 is spaced from and substantially parallel to the first pivot axis PA1. Each axle may be defined as a unitary axle disposed along each of the pivots such that the axle spans the entire distance between the peripheral member 48, along the pivot axis. Alternatively, each axle may comprise a pair of axles disposed along each of the pivots, such that each of the axles extends only partially between the peripheral member 48 and along each of the pivot axes PA1, PA2, as best shown in FIG. 8. In one embodiment, one axle may be the unitary axle and the other axle may be the pair of axles.

Each of the first and second blades 62, 64 include a distal edge 72 and a proximal end 74. The distal edge 72 of each of the blades 62, 64 defines a shape substantially complementary to a portion of the opening 52 defined by the peripheral member 48. For example, if the opening 52 defines a circular configuration, the distal edge 72 of each of the first and second blades 62, 64 may define an arcuate configuration, such as a semicircle. The distal edge 72 of each of the blades 62, 64 is configured to engage the periphery 54 of the peripheral member 48 and cover the opening 52 defined by the frame 46. The proximal end 74 of each of the blades 62, 64 is configured to abut and seal against the bifurcating member 50. More specifically, each of the blades 62, 64 further includes a top surface 76 and a bottom surface 78 spaced from the top surface 76. As best seen in FIG. 8, reinforcing ribs 79 are disposed upon the bottom surface 78 of the blades 62, 64. The top surface 76 abuts the peripheral member 48 adjacent the distal edge 72 and the bottom surface 78 abuts the bifurcating member 50 adjacent the proximal end 74 when the blades 62, 64 are covering the opening 52.

A link 80, having a first end 82 and a second end 84 spaced from the first end 82, is disposed between each of the blades 62, 64 and the articulating member 56 for movably coupling each of the blades 62, 64 to the articulating member 56. Each link 80 transfers motion from the articulating member 56 to the first and second blades 62, 64 respectively to move the articulating member 56 between the open and closed positions. The first end 82 of each link 80 is coupled articulating member 56. Typically, the first end 82 of the link 80 is coupled to the collar 60 of the articulating member 56. The second end 84 of the link 80 is coupled to the first blade 62 or the second blade 64. The second end 84 of the link 80 is coupled to the blade between the pivot axis and the distal end of each of the blades 62, 64 respectively. The link 80 transfers the linear motion of the articulating member 56 to each blade thereby causing each blade to rotate about the respective rotational axis, in opposite directions from one another. For example, the first blade 62 rotates in a clockwise direction as the articulating member 56 move toward the closed position while the second blade 64 rotates in a counter-clockwise direction. Said differently, the movement of one of the blades 62, 64 mirrors the movement of the other of the blades 62, 64. When the articulating member 56 is located in the closed position, the blades 62, 64 cover the opening 52 and when the articulating member 56 moves toward the open position, the blades 62, 64 at least partially expose the opening 52.

The present disclosure has been described herein in an illustrative manner, and it is to be understood that the terminology which has been used is intended to be in the nature of words of description rather than of limitation. Obviously, many modifications and variations of the present disclosure are possible in light of the above teachings. The disclosure may be practiced otherwise than as specifically described within the scope of the appended claims

What is claimed is:

1. A damper assembly for removing particulate material from an industrial duct having a bottom wall receiving the particulate material, comprising:
    a frame surrounding an opening in said bottom wall having a periphery;
    a vertical articulating member movable axially between an upper closed position and a lower open position;
    first and second blades each having an outer distal edge defining one half of said periphery of said opening when said vertical articulating member is in said closed position, and proximal adjacent edges;
    said blades each pivotally supported on said frame adjacent to but spaced from said proximal edges for balancing particulate material disposed on said blades;
    a pair of links each having one end pivotally supported on said articulating member and an opposed end pivotally attached to said blades at a mid-portion of said blades; and
    said blades supporting the particulate material on the bottom wall of the duct when said vertical articulating member is in said upper closed position with the links in compression, and said blades rotating to an open position when said articulating member moves to said lower open position with said links remaining in compression to rigidly support said blades.

2. The damper assembly as defined in claim 1, wherein said articulating member is a vertical shaft having a collar and one end of each of said links is pivotally supported on said collar.

3. The damper assembly as defined in claim 1, wherein said links have a length to rigidly support said blades in the open position at an angle of less than ninety degrees directing particulate material away from said articulating member.

4. The damper assembly as defined in claim 1, wherein said articulating member moves downwardly from said closed position to said open position and said links supporting said blades in the open position.

5. The damper assembly as defined in claim 1, wherein said links are disposed beneath said blades with the opposed end pivotally attached to an underside of said blades at a mid-portion of said blades supporting an underside of said blades.

6. The damper assembly as defined in claim 1, wherein said distal ends of said blades seal on top of a bifurcating member in the closed position and said articulating member passes through said bifurcating member.

* * * * *